US007267299B2

(12) United States Patent
Lamont

(10) Patent No.: US 7,267,299 B2
(45) Date of Patent: Sep. 11, 2007

(54) AIRCRAFT

(76) Inventor: John S. Lamont, 30th Floor - 360 Main Street, Winnipeg, Manitoba (CA) R3C 4G8

( * ) Notice: Subject to any disclaimer, the term of this patent is extended or adjusted under 35 U.S.C. 154(b) by 267 days.

(21) Appl. No.: 11/039,847

(22) Filed: Jan. 24, 2005

(65) Prior Publication Data

US 2005/0230518 A1 Oct. 20, 2005

(30) Foreign Application Priority Data

Feb. 27, 2004 (CA) .................... 2459200

(51) Int. Cl.
*B64C 15/02* (2006.01)
(52) U.S. Cl. ................... 244/12.3
(58) Field of Classification Search ........... 244/6, 244/10, 21, 17.11, 17.23, 12.1–12.2, 73 C; 416/129, 213 A–213 D
See application file for complete search history.

(56) References Cited

U.S. PATENT DOCUMENTS

| 1,038,073 | A | * | 9/1912 | Weir | 244/23 C |
|---|---|---|---|---|---|
| 1,724,226 | A | * | 8/1929 | Sorensen | 244/23 R |
| 1,753,112 | A | * | 4/1930 | Engledow | 244/6 |
| 2,008,464 | A | * | 7/1935 | Nishi | 244/23 C |
| 2,717,131 | A | * | 9/1955 | Barrett | 244/6 |
| 3,002,709 | A | * | 10/1961 | Cochran | 244/12.2 |
| 3,103,324 | A | * | 9/1963 | Price | 244/12.2 |
| 3,104,853 | A | * | 9/1963 | Klein | 244/12.2 |
| 3,122,342 | A | * | 2/1964 | Weir | 244/17.11 |
| 3,288,396 | A | * | 11/1966 | Gouin | 244/17.23 |
| 4,773,618 | A | | 9/1988 | Ow | |
| 4,913,376 | A | * | 4/1990 | Black | 244/8 |
| 5,039,031 | A | | 8/1991 | Valverde | |
| 5,072,892 | A | | 12/1991 | Carrington | |
| 5,149,012 | A | | 9/1992 | Valverde | |
| 5,213,284 | A | * | 5/1993 | Webster | 244/23 C |
| 5,240,204 | A | | 8/1993 | Kunz | |
| 5,503,351 | A | * | 4/1996 | Vass | 244/34 A |
| 6,062,508 | A | * | 5/2000 | Black | 244/8 |
| 6,113,029 | A | * | 9/2000 | Salinas | 244/23 C |
| 6,371,406 | B1 | * | 4/2002 | Corcoran | 244/12.2 |
| 6,450,446 | B1 | * | 9/2002 | Holben | 244/34 A |
| 7,032,861 | B2 | * | 4/2006 | Sanders et al. | 244/23 A |
| 2005/0230518 | A1 | * | 10/2005 | Lamont | 244/7 A |

FOREIGN PATENT DOCUMENTS

| DE | 1 288 924 | 9/1965 |
|---|---|---|
| EP | 94402530.3 | 9/1994 |
| FR | 1 129 038 | 5/1955 |

* cited by examiner

*Primary Examiner*—Stephen A. Holzen
(74) *Attorney, Agent, or Firm*—Ryan W. Dupuis; Adrian D. Battison; Michael R. Williams

(57) ABSTRACT

An aircraft includes a fuselage with a circular airfoil body supported thereabove on a vertical drive shaft mechanism. The airfoil body includes an upper disk forming an upper surface of the body and a lower disk forming a lower surface of the body in which the upper and lower disks are supported at a fixed spacing on the vertical drive shaft mechanism for counter-rotation. Vanes are supported in both the upper and lower disks which are movable between a takeoff position in which the vanes are supported in respective openings in the disk for diverting air downwardly through the openings in the disks as the disks are rotated and a cruising position in which a surface of the vanes are continuous with the respective upper and lower surfaces of the bodies.

19 Claims, 4 Drawing Sheets

AIRCRAFT

FIELD OF THE INVENTION

The present invention relates to an aircraft and more particularly to an aircraft employing a rotary lifting system for take off with little or no forward ground speed.

BACKGROUND

Conventional aircraft rely on forward thrusters and wing design to generate the required lift for take-off and to maintain cruising altitude. These aircraft however require more powerful engines and wing sizes of greater thickness and size for landing and take-off than are required to maintain the aircraft's speed and altitude at normal cruise height. The engines are thus heavier and the wings create more drag than is necessary to sustain the aircraft at cruising altitudes. In addition, conventional aircraft require very strong and relatively heavy landing gear in order to sustain the forces involved in landing the aircraft at their required landing speeds. The excessive weight of these components reduces load carrying capacity and efficiency during normal flight of the aircraft.

Various known modified aircraft have been arranged for vertical take-off to avoid the problems normally associated with taking off and landing of conventional aircraft. These modified aircraft generally use separate engines for vertical and horizontal thrust or require complex mechanisms to generate both the vertical and horizontal thrust and maintain directional stability. These known designs are thus generally complex and costly and result in reduced efficiency and economy.

SUMMARY

According one aspect of the present invention there is provided an aircraft comprising:
  a fuselage;
  a circular airfoil body in the shape of an airfoil and including an upper disk forming an upper surface of the body and a lower disk forming a lower surface of the body;
  a vertical drive shaft mechanism supporting the upper and lower disks for counter-rotation relative to the fuselage above the fuselage at a fixed spacing relative to one another; and
  vanes supported in the both the upper and lower disks which are movable between a take-off position in which the vanes are supported in respective openings in the disks for diverting air downwardly through the openings in the disks as the disks are rotated and a cruising position in which a surface of the vanes are continuous with the respective upper and lower surfaces of the body.

In the present invention the forward drive system directly provides forward thrust for efficient normal cruising altitude flight, while the vanes of the rotary lifting system coupled thereto provide the necessary lift at speeds less than stall speed, as required for take-off and landing for example. In this arrangement the initial power or forward thrust of the forward drive system can be devoted entirely to providing power for lift off using the rotary lifting system and thus is not immediately employed to build up air speed and overcome friction for take-off. The engines of the forward drive system are thus not required to be any larger or more powerful than appropriate for sustaining flight at normal cruise height. The airfoil shape of the rotary lifting system permits the wings of conventional aircraft to be reduced or even eliminated to minimize excessive drag from wings which are larger than necessary for normal cruise on conventional aircraft. The rotary lifting system may further be used when landing the aircraft to permit landing at very slow or even zero speeds, eliminating the need for very strong and heavy landing gear, resulting in a reduction of weight and a more efficient aircraft. The aircraft according to this design may thus be considerably more economical in fuel consumption than conventional aircraft currently in use.

The fixed spacing of the disks supported on the vertical draft shaft mechanism provides a simple construction which is effectively takes advantage of the benefits of reducing engine size for take off and landings as noted above.

The upper surface of the body formed by the upper disk is preferably convex with the lower surface of the body formed by the lower disk being flatter than the upper surface.

The lower disk is preferably received within the upper disk in both the takeoff position and cruising position of the vanes extending the upper disk to curve downwardly and outwardly at a peripheral edge thereof beyond an upper surface of the lower disk. A gap in a radial direction between a peripheral edge of the lower disk and a peripheral edge of the upper disk is preferably provided to maintain the upper and lower disks separated and spaced apart.

A hollow interior preferably spans between the upper and lower disks.

Each disk may include a hub supporting the disk on a respective shaft and a continuous peripheral edge, wherein the vanes span substantially a full radius of the disk between the hub and the continuous peripheral edge thereof.

The disks are preferably fixed against rotation in relation to the fuselage in the cruising position of the vanes.

The vertical draft shaft mechanism preferably includes an outer shaft supporting the lower disk thereon and an inner shaft concentric with the outer shaft and supporting the upper disk thereon in which the inner and outer shafts are coupled for counter-rotation by gearing which is driven by a power take off shaft coupled to jet engines which propel the aircraft in a forward direction.

BRIEF DESCRIPTION OF THE DRAWINGS

In the accompanying drawings, which illustrate exemplary embodiments of the present invention.

DETAILED DESCRIPTION

Figure 1:
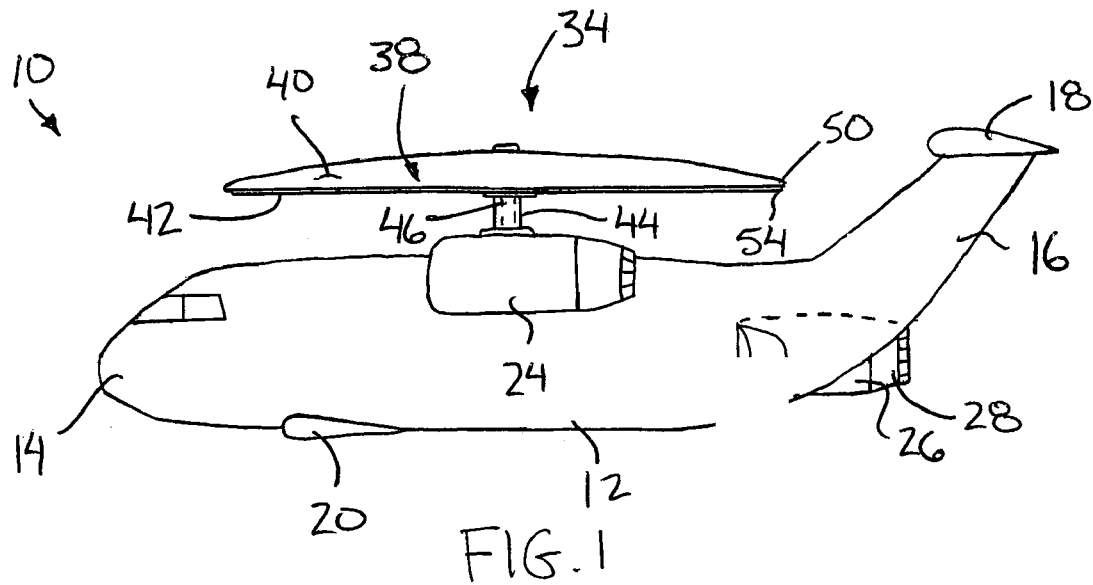
FIG. 1 is a side elevational view of the aircraft.
Figure 2:
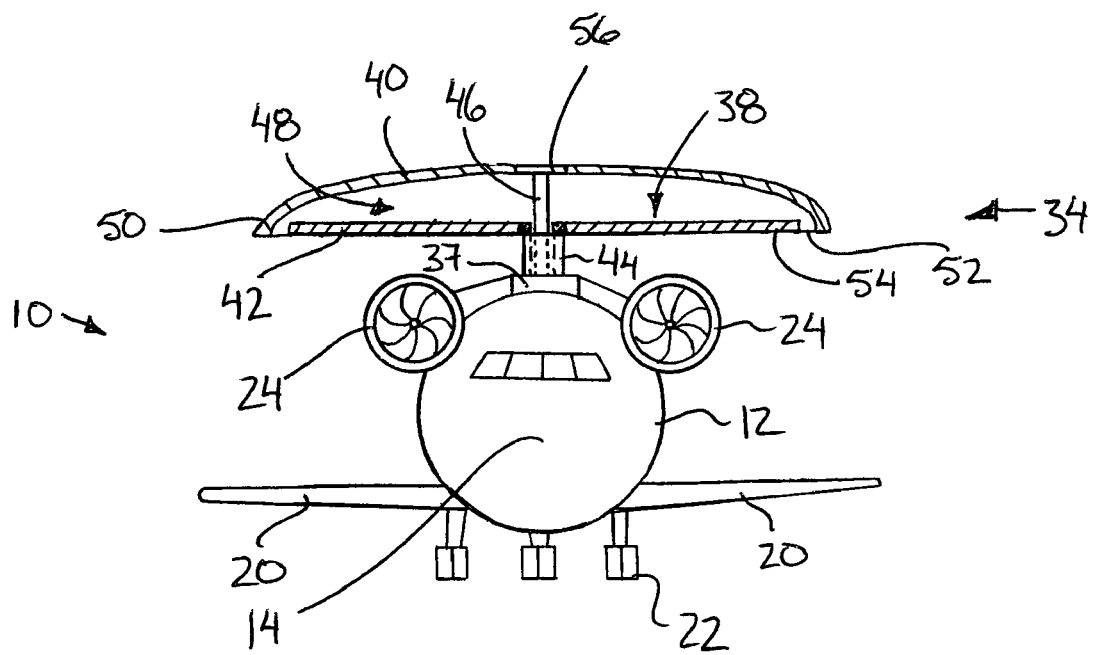
FIG. 2 is a partly sectional front elevational view of the aircraft.
Figure 3:
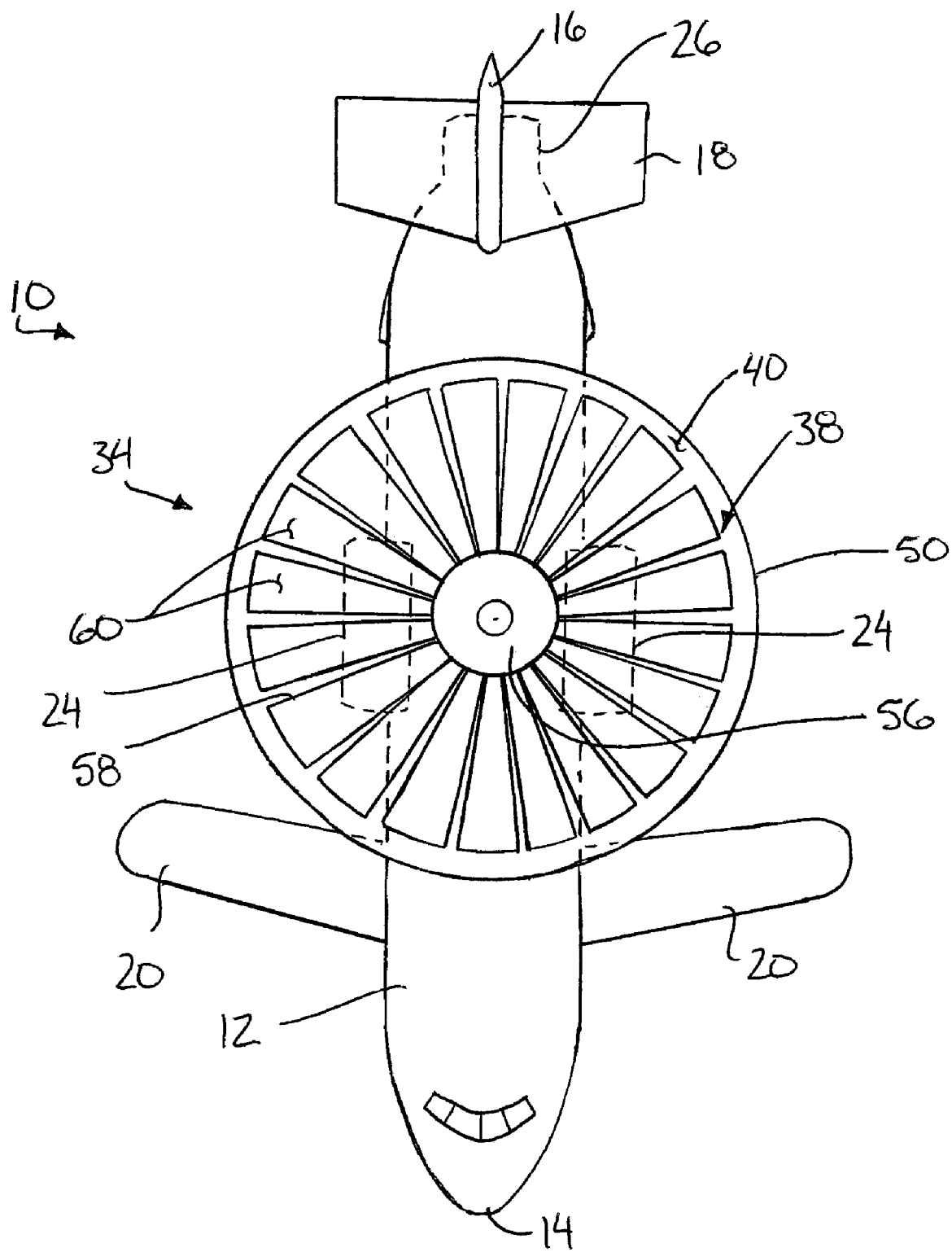
FIG. 3 is a top plan view of the aircraft.
Figure 5:
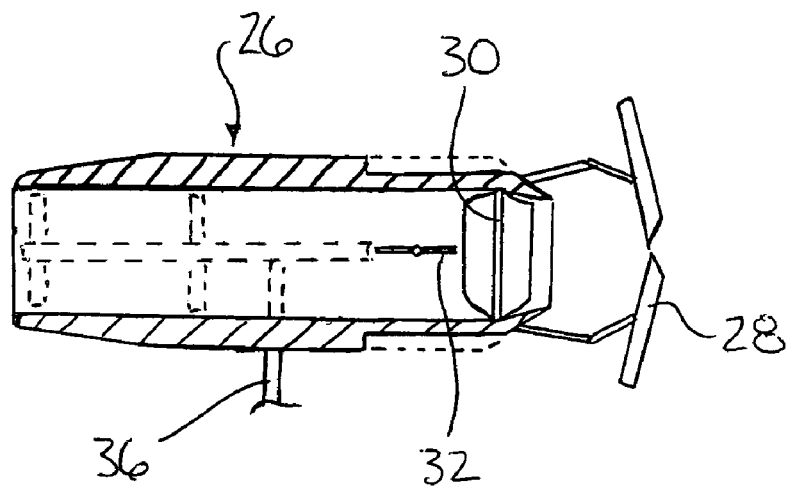
FIG. 5 is a sectional view of one of the engines.

Referring to the accompanying figures there is illustrated an aircraft generally indicated by reference numeral 10. The aircraft 10 is particularly suited for vertical takeoff and landing as well as for cruising in a manner which is typically more efficient than conventional aircraft.

The aircraft 10 includes an elongate tubular fuselage 12 which is similar to conventional passenger aircraft. The fuselage includes a tapered nose 14 at a front end and a rudder 16 and stabilizer 18 mounted together at the rear end. A pair of wings 20 are provided adjacent a bottom of the fuselage to project laterally outwardly from opposing sides of the aircraft. Landing gear 22 is provided for supporting the aircraft for rolling movement along the ground when landing. A pair of jet engines 24 are spaced apart on opposing sides of the aircraft partway along the fuselage 12 between the front and rear ends. An auxiliary jet engine 26 is mounted at the rear of the fuselage below the rudder and stabilizer. The rear jet engine 26 includes a thrust reverser mechanism 28 which balances forward and reverse thrust of the jet engines when engaged for vertical takeoff situations.

For enhanced steering, at least one vertical baffle 30 and one horizontal baffle 32 are provided within the exhaust stream of one or more of the jet engines 24 and 26. The inclination of the baffles about respective vertical and horizontal axis thereof can be adjusted from a parallel position to an inclined position in which some of the thrust is diverted for assisting in steering the aircraft and for maintaining level flight.

An auxiliary lift system 34 is provided above the fuselage 12 midway between the front and rear ends so as to be located substantially above the center of gravity of the aircraft. Power takeoff shafts 36 are suitable coupled to the rotary components of respective ones of the jet engines 24 and 26 to be driven for rotation by the engines. The power takeoff shafts 36 in turn drive rotation of the auxiliary lift system 34 to provide auxiliary lift to the aircraft by connection through a gearbox 37.

The lift system 34 comprises a generally airfoil shaped body 38 which is circular as viewed from above. In cross section the body 38 has a generally airfoil shape consisting of an upper disk 40 which forms an upper surface of the airfoil and a lower disk 42 which defines the lower surface of the body.

The lower disk 42 is rotatably supported on an outer shaft 44 driven by rotation of the power takeoff shafts in communication with the turbines in the engines. A concentric inner drive shaft 46 extends through the outer drive shaft for supporting the upper disk 40 at a top end thereof for independent rotation in relation to the lower disk. The upper and lower disks are maintained at a fixed spacing along the respective inner and outer drive shafts to define a hollow interior 48 therebetween.

The upper disk 40 includes a convex outer surface which curves downwardly and outwardly to a periphery 50 which extends downwardly beyond a top end of the lower disk 42.

The lower disk has an outer surface which is flatter than that of the upper disk 40 to define the generally airfoil shaped configuration of the airfoil body 38. The lower disk is smaller in diameter and is received within the concave interior of the upper disk 40 such that a gap 52 is defined between a periphery 54 of the lower disk 42 and the periphery 50 of the upper disk in a radial direction.

Each disk includes a hub 56 centrally located therein which mounts the disk onto the respective shaft. Each disk includes a continuous edge about the periphery thereof. A plurality of circumferentially spaced openings 58 are formed in the surface of the disk which are generally wedge shaped and span between the hub 56 and the peripheral edge with increasing width as radial distance increases.

Figure 4:
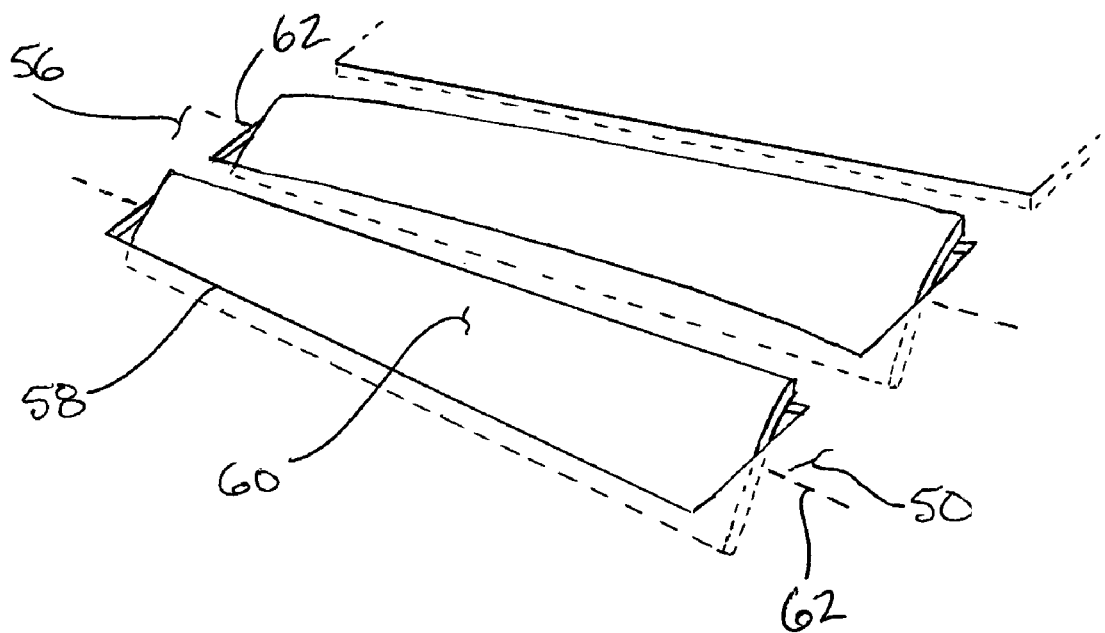
FIG. 4 is a perspective view of the vanes in an open position.
Figure 6:
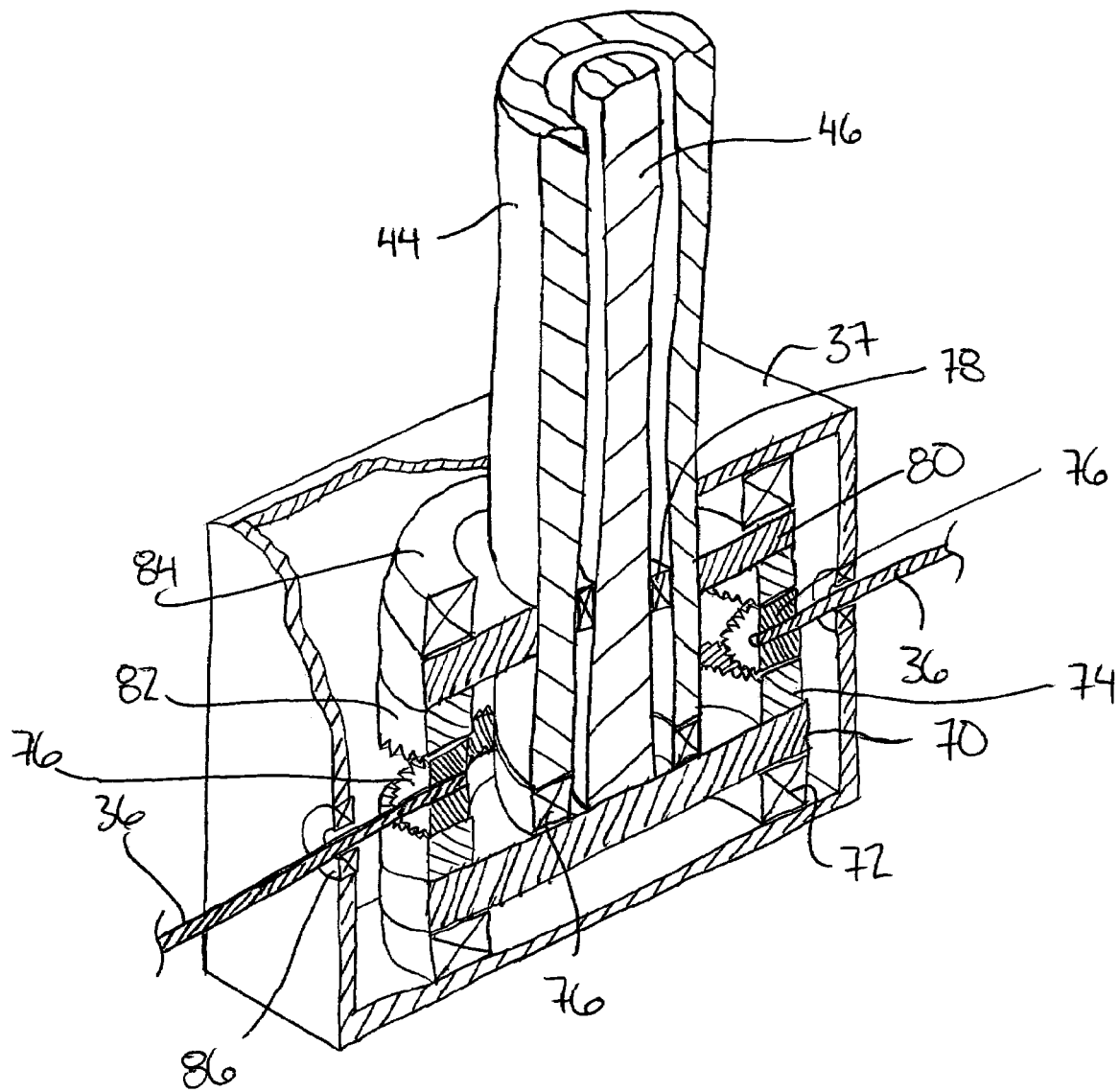
FIG. 6 is a partly sectional perspective view of a gearbox of the aircraft.

A vane 60 is supported within each of the openings 58 to fit fully spanning the opening from the hub to the peripheral edge in a closed position of the vane. Each of the vanes 60 is movable about a radially extending axis 62 for pivotal movement between a takeoff position as illustrated in FIG. 4 in which the vanes lie transversely to the openings in the outer surface of the disks and a cruise position in which the vanes fully span the opening so as to be smooth and continuous with the outer surface of the respective disks. In the takeoff position, the disks counter rotate as driven by the power takeoff shafts which couple the respective inner and outer shafts 46 and 44 to power takeoff turbines 36 within the exhaust of the engines.

The gearbox 37 is supported on top of the fuselage 12 of the aircraft for both rotatably supporting the upper and lower discs in relation to the fuselage and for housing the gearing which couples the power takeoff shafts 36, in communication with respective jet engines 24 and 26, with the inner and outer drive shafts 44 and 46 respectively. The inner drive shaft 46 is supported on an annular plate 70 for rotation therewith on suitable bearings 72 supported thereunder in an annular configuration for carrying the weight of the discs on the bottom wall of the gearbox 37. A lower ring gear 74 is mounted about a periphery of the plate 70 with upwardly facing teeth which engage a drive gear 76 coupled to each drive shaft 36 at diametrically opposed positions in the gearbox. Accordingly rotation of the drive shafts 36 cause rotation of the ring gear 74 and inner drive shaft connected thereto in a first direction.

The outer drive shaft 44 includes an annular bearing 76 at a bottom end thereof which rotatably supports the outer drive shaft on the annular plate 70 about the inner drive shaft 46. Intermediate bearings 78 are mounted between the inner and outer drive shafts at various spaced positions therealong. The outer drive shaft 44 includes an annular flange 80 projecting radially therefrom which is parallel and spaced above the annular plate 70 associated with the inner drive shaft 46. Similarly the annular flange 80 is coupled to rotate with the outer shaft 44 and supports a ring gear 82 about a periphery thereof with downwardly facing gear teeth which confront the gear teeth of ring gear 74 on the lower annular plate 70. The gear teeth of the ring gear 82 mesh with the same drive gears 76 on the power takeoff drive shafts 36 for rotation in a second direction opposite to the first direction of the annular plate 70.

Accordingly the outer drive shaft is driven to counter rotate relative to the inner drive shaft 46. An annular bearing 84 is coupled between the annular flange 80 and an upper wall of the housing of the gearbox 37. The housing of the gearbox 37 is fixed in relation to the fuselage of the aircraft such that lifting action on the drive shafts causes the annular flange 80 to abut against the bearing 84 which transfers the lifting force of the rotary lift mechanism 34 to the fuselage of the aircraft through the walls of the gearbox 37. Auxiliary bearings 86 receive the power takeoff drive shafts 36 therethrough at the side walls on opposing sides of the gearbox 37. The construction in which confronting ring gears are associated with respective ones of the inner and outer drive shafts for meshing with opposing sides of drive gears 76 on the power takeoff shafts 36, ensures that the upper and lower discs are positively driven and rotated in opposite directions.

In operation, for vertical takeoff and landing, the thrust reverser mechanism is engaged so that forward and reverse thrust of the engines are substantially balanced. The power takeoff shafts are engaged for counter rotating the upper and lower disks with the vanes deployed in the takeoff positions. Rotation of the disks causes air to be forced by the vanes downwardly through the respective openings and through the hollow interior of the airfoil body to lift the aircraft vertically off the ground. Once lifted from the ground, the thrust reversers can be disengaged so that the engines begin to advance the aircraft forwardly through the air.

Further power is diverted to the engines for normal cruising by disengaging the power takeoff shafts which drive the respective inner and outer shafts of the airfoil body. The accelerated forward motion of the aircraft in relation to the surrounding air causes lift by action of the wings, and the airfoil body which provides lift when the vanes are closed in the cruise position. When landing, the reverse operations of lift-off are performed.

As described above, the aircraft consists of a conventional aircraft hull with two counter-rotating circular disks mounted directly above the hull, preferably from its center of gravity under normal load conditions. The disks are attached to the hull by appropriate means and powered by axles geared to two jet engines located side by side immediately above the aircraft hull. The engines drive the circular disks to provide lift for takeoff and landing at 0 or low speeds when vanes in the circular disks are deployed.

The engines are of appropriate power sufficient to move the circular disks at a speed sufficient to provide the lift necessary for takeoff and after takeoff, to move the aircraft to a speed above its stall speed, at which point the vanes would be undeployed and flattened against the circular disks. The disks would then be brought to a stationary position relative to the aircraft hull, the power to the disks shut off and the jet engines then divert it entirely to moving the aircraft forward. The vanes are intended to provide lift, but not propulsion for the aircraft.

For normal cruising flight, the vanes in the circular disks remain undeployed, the disks would remain stationary. The upper disk is somewhat airfoil shaped to contribute to the lift required for normal flight. The lower disk fits in the hollow formed by the airfoil shape of the upper disk.

Since the upper circular disk is not an ideal airfoil, it is desirable to have lower wings attached to the bottom of the hull, to provide a balanced lift. These provide space for gasoline tanks, and add lift. If the lower wings are fairly short, and placed slightly forward of the disks, they do not unduly interfere with the lifting capacity of the circular disks when in operation.

Since the kind of control surfaces employed by conventional aircrafts are not sufficiently effective at the low speeds of takeoff and landing involved in this aircraft design, special provision to provide horizontal and vertical stability and control is provided by horizontal and vertical baffles located in the engines exhaust flow.

A third jet engine is supported at the rear of the aircraft hull, to provide the thrust required to bring the aircraft up to above stall speed. A rear rudder and elevator provide directional controls at normal cruising speed. The third jet engine is provided with thrust reversers, in order to moderate the aircrafts forward motion during takeoff and landing.

The aircraft according to the present invention has the following advantages:

1. Since the initial power of the front engines can be devoted entirely to providing power for lift-off and is not immediately required to build up air speed and overcome ground friction for takeoff, and accordingly the engines do not require to be any larger or more powerful than appropriate for sustaining normal cruise flight;
2. The excess drag involved in wings which are larger than necessary for normal cruise is eliminated; and
3. Since the aircraft is designed to land at very slow or even zero speeds, the necessity for very strong and heavy landing gear is eliminated.

These factors indicate that this design of aircraft is considerably more economical in fuel consumption than the types of aircraft currently in use.

For civilian purposes, the aircraft 10 enjoys the advantage over other designs of not requiring the use of conventional airports for landing and take-off. Airlines using this invention will be able to utilize their own relatively small landing pads adjacent to city centers, and thereby avoid landing fees at regular airports. This would also enable airlines utilizing this design of aircraft to provide their customers with easy access to and from city centers, and enable their passengers to avoid the usual long drive to airports at the outskirts of the cities being served. This factor would be a distinct marketing advantage.

This design also enables airlines to make stops at locations without airports, and enables remote locations to provide for air services by building relatively inexpensive landing pads, and to avoid the expense of airports with long runways.

While various preferred embodiments of the present invention have been described in the foregoing, it is to be understood that other embodiments are possible within the scope of the invention. For example, there may be provided only one or plural power take-off shafts connected to the engines for driving the auxiliary lift system. When plural power take-off shafts are provided, these may each be coupled directly to the gearbox of the auxiliary lift system as shown in the illustrated embodiment, or alternatively, the output of the power take-off shafts may be combined separately from the gearbox with only a single drive shaft being connected to the ring gears of the gearbox described above. The invention is to be considered limited solely by the scope of the appended Claims.

The invention claimed is:

1. An aircraft comprising:
    a fuselage;
    a circular airfoil body, wherein the body is generally hollow and defined by an upper and lower surface, the upper surface comprising an upper disk and the lower surface comprising a lower disk;
    a vertical drive shaft mechanism supports the upper and lower disks above the fuselage and at a fixed spacing relative to one another, wherein the upper and lower disks are arranged to counter-rotate relative to one another;
    wherein the lower disk has a plurality of first openings and wherein the lower disk has a first plurality of vanes each supported in a respective one of said first openings, said first plurality of vanes are movable between a take off position and a cruising position; wherein in the take off position the first plurality of vanes are arranged for diverting air downwardly through the first openings, wherein in the cruising position the first plurality of vanes are continuous with the lower surface of the lower disk such that the each of the first plurality of vanes substantially fully span a respective one of said first openings;
    wherein the upper disk has a plurality of second openings and wherein the upper disk has a second plurality of vanes each supported in a respective one of said plurality of second openings, said second plurality of vanes are movable between a take off position and cruising position; wherein in the take off position the second plurality of vanes are arranged for diverting air downwardly through the second openings, wherein in the cruising position the second plurality of vanes are continuous with the upper surface of the upper disk such that each of the second plurality of vanes substantially fully span a respective one of said second openings.

2. The aircraft according to claim 1 wherein the upper surface of the body formed by the upper disk is convex.

3. The aircraft according to claim 2 wherein the lower surface of the body formed by the lower disk is flatter than the upper surface.

4. The aircraft according to claim 1 wherein the lower disk is received within the upper disk.

5. The aircraft according to claim 4 wherein there is provided a gap in a radial direction between a peripheral edge of the lower disk and a peripheral edge of the upper disk.

6. The aircraft according to claim 1 wherein the upper disk curves downwardly and outwardly at a peripheral edge thereof beyond an upper surface of the lower disk.

7. The aircraft according to claim 1 wherein each disk includes a hub supporting the disk on a respective shaft and a continuous peripheral edge, wherein the vanes span substantially a full radius of the disk between the hub and the continuous peripheral edge thereof.

8. The aircraft according to claim 1 wherein the disks are fixed in relation to the fuselage.

9. The aircraft according to claim 1 wherein the vertical draft shaft mechanism includes an outer shaft supporting the lower disk thereon and an inner shaft concentric with the outer shaft and supporting the upper disk thereon, the inner and outer shafts being coupled by gearing for counter-rotation, the gearing being driven by a power take off shaft coupled to jet engines which propel the aircraft in a forward direction.

10. An aircraft comprising:
a fuselage:
a circular airfoil body including an upper disk forming an upper surface of the body and a lower disk forming a lower surface of the body;
a vertical drive shaft mechanism supporting the upper and lower disks for counter-rotation relative to one another above the fuselage at a fixed spacing relative to one another; and
vanes supported in both the upper and lower disks which are movable between a take-off position in which the vanes are supported in openings in the disks for diverting air downwardly through the openings in the disks as the disks are rotated and a cruising position in which a surface of the vanes are continuous with the surfaces of the body;
wherein the lower disk is received within the upper disk.

11. The aircraft according to claim 10 wherein there is provided a gap in a radial direction between a peripheral edge of the lower disk and a peripheral edge of the upper disk.

12. The aircraft according to claim 10 wherein the upper surface of the body formed by the upper disk is convex and the lower surface of the body formed by the lower disk is flatter than the upper surface.

13. The aircraft according to claim 10 wherein the airfoil body includes a hollow interior spanning between the upper and lower disks.

14. The aircraft according to claim 10 wherein the disks are fixed in relation to the fuselage.

15. The aircraft according to claim 10 wherein the vertical drive shaft mechanism includes an outer shaft supporting the lower disk thereon and an inner shaft concentric with the outer shaft and supporting the upper disk thereon, the inner and outer shafts being coupled by gearing for counter-rotation, the gearing being driven by a power take off shaft coupled to jet engines which propel the aircraft in a forward direction.

16. An aircraft comprising:
a fuselage;
a circular airfoil body including an upper disk forming an upper surface of the body and a lower disk forming a lower surface of the body;
a vertical drive shaft mechanism supporting the upper and lower disks for counter-rotation relative to one another above the fuselage at a fixed spacing relative to one another; and
vanes supported in both the upper and lower disks which are movable between a take-off position in which the vanes are supported in openings in the disks for diverting air downwardly through the openings in the disks as the disks are rotated and a cruising position in which a surface of the vanes are continuous with the surfaces of the body;
wherein the upper disk curves downwardly and outwardly at a peripheral edge thereof beyond an upper surface of the lower disk.

17. The aircraft according to claim 16 wherein the upper surface of the body formed by the upper disk is convex and the lower surface of the body formed by the lower disk is flatter than the upper surface.

18. The aircraft according to claim 16 wherein the disks are fixed in relation to the fuselage.

19. The aircraft according to claim 16 wherein the vertical drive shaft mechanism includes an outer shaft supporting the lower disk thereon and an inner shaft concentric with the outer shaft and supporting the upper disk thereon, the inner and outer shafts being coupled by gearing for counter-rotation, the gearing being driven by a power take off shaft coupled to jet engines which propel the aircraft in a forward direction.

* * * * *